United States Patent [19]

Raggi

[11] Patent Number: 4,829,883

[45] Date of Patent: May 16, 1989

[54] PISTONS

[75] Inventor: Lodovico Raggi, Milan, Italy

[73] Assignee: Associated Engineering Italy S.p.A., Alpignano, Turin, Italy

[21] Appl. No.: 819,692

[22] Filed: Jan. 10, 1986

[30] Foreign Application Priority Data

Jan. 11, 1985 [IT] Italy .............................. 190848A/85

[51] Int. Cl.⁴ ................................................. F02F 3/00
[52] U.S. Cl. ....................................... 92/222; 92/227; 123/193 P
[58] Field of Search ................. 92/172, 203, 207, 218, 92/219, 227, 229, 222; 123/193 P

[56] References Cited

U.S. PATENT DOCUMENTS

| | | |
|---|---|---|
| 2,294,519 | 9/1942 | Starr . |
| 2,297,460 | 9/1942 | Dietrich ........................... 123/193 P |
| 2,349,919 | 5/1944 | Starr ..................................... 92/257 |
| 2,550,879 | 5/1951 | Stevens ................................ 92/222 |
| 3,075,817 | 1/1963 | Mayes . |
| 3,104,594 | 9/1963 | Reiners ............................ 92/229 X |
| 4,488,522 | 12/1984 | Jones ............................ 123/193 PX |

FOREIGN PATENT DOCUMENTS

| | | |
|---|---|---|
| 185618 | 5/1956 | Austria . |
| 2015766 | 10/1971 | Fed. Rep. of Germany . |
| 566312 | 2/1924 | France ................................... 92/227 |
| 858512 | 11/1940 | France . |
| 440838 | 1/1968 | Switzerland . |
| 607966 | 9/1948 | United Kingdom ................... 92/227 |
| 642042 | 8/1950 | United Kingdom ................... 92/227 |
| 1283956 | 8/1972 | United Kingdom . |
| 2023765 | 1/1980 | United Kingdom ............ 123/193 P |

*Primary Examiner*—Gerald A. Michalsky
*Attorney, Agent, or Firm*—Leydig, Voit & Mayer

[57] ABSTRACT

An aluminium or aluminium alloy cast piston has a piston ring carrier of a ferrous material encast therein. The carrier has sides which converge towards their radially inner ends. As a result of this, and as a result of a lesser coefficient of thermal expansion of the ferrous material of the carrier as compared with the aluminium or aluminium alloy of the piston body, solidification of the piston material causes elastic outward expansion of the carrier which is sufficient to prevent any clearance occurring between the two parts, even at operating temperatures. Thus the carrier is not, and need not, be locked to the piston body against radial movement.

2 Claims, 3 Drawing Sheets

PISTONS

BACKGROUND TO THE INVENTION

1. Field of the Invention

The invention relates to pistons of aluminium or aluminium alloy for internal combustion engines.

Pistons of aluminium or aluminium alloy have been used extensively for many years in internal combustion engines. They have the advantage, in comparison with pistons of ferrous materials, of being light in weight and so offer improved performance. However, aluminium or aluminium alloys are, in general, not as resistant to wear as ferrous materials and this produces a problem in relation to the piston rings carried by such pistons. These piston rings are commonly made of ferrous materials and are received in respective piston ring grooves extending around the piston. During reciprocation of the piston, the piston rings move in their associated grooves and tend to cause wear of the grooves, which can lead to loss of performance of the associated engine and, eventually, to piston failure.

2. Review of the Prior Art

In view of this problem, it has been customary to incorporate into aluminium or aluminium alloy pistons, a piston ring carrier of a material more wear-resistant than the aluminium or aluminium alloy. For example, piston ring carriers of ferrous materials are commonly used. The piston ring carrier is provided with one or more piston ring grooves for receiving associated piston rings and, because of the improved wear-resistance of ferrous materials, as compared with aluminium or aluminium alloys, the wear problem between the ring and groove is at least mitigated.

Because such carriers are formed separately from the piston and are encast during manufacture of the piston, it has been the practise to ensure that there is no possibility of relative movement between the carrier and the piston, particularly in radial directions relative to the axis of the piston and in directions parallel to the axis of the piston. The reason for this is that it has been thought that if such movement were to occur, there would be fretting and wear between the mating surfaces of the carrier and the piston body and that this would lead eventually to such movement of the carrier as would damage either the piston body and/or the associated cylinder or liner. There are numerous proposals for preventing such movement. There is the well known and widely used AL-FIN bond in which the carrier is made of austenitic cast iron (which has a similar coefficient of thermal expansion to aluminium or aluminium alloys) and in which a positive bond is created between the carrier and the piston body. In addition, there are numerous examples of carriers which are provided with formations which form a positive mechanical interlock between the carrier and the piston body. Examples of these are shown in British Patent Specifications Nos. 1 283 956 and 548,400.

Of course, all these proposals increase the manufacturing cost of the piston and, where mechanical interlocks are provided, increase the weight of the piston, so decreasing its performance. In particular, the use of an AL-FIN bond increases the cost of piston production, because austenitic cast iron is more expensive than normal cast irons such as grey cast iron, and because austenitic cast iron is more difficult to cast and machine than other cast irons.

SUMMARY OF THE INVENTION

According to a first aspect of the invention, there is provided a piston for an internal combustion engine comprising a cast piston body of aluminium or an aluminium alloy, an encast annular piston ring carrier of a material having a lesser coefficient of thermal expansion than the material of the piston body, the carrier not being locked against radial movement relative to the piston body and having upper and lower annular radially extending surfaces, one of said surfaces being inclined relatively to a plane including the carrier axis, so that said surfaces converge to the radially inner ends thereof.

According to a second aspect of the invention, there is provided a piston for an internal combustion engine comprising a cast piston body of aluminium or an aluminium alloy, and an encast annular piston ring carrier of a material having a lesser coefficient of thermal expansion than the material of the piston body, the carrier having upper and lower annular radially extending surfaces such that the piston body applies a radially outward force to the piston ring carrier at all operating temperatures of the piston body and the carrier.

According to a third aspect of the invention, there is provided a method of manufacturing a piston for an internal combustion engine, comprising placing in a piston casting mould a piston ring carrier having two spaced annular radially extending surfaces, one of said surfaces being inclined relative to a plane including the carrier axis, so that said surfaces converge towards the radially inner ends thereof, and then filling the mould with molten aluminium or aluminium alloy to cast a piston body around the carrier, the material of the carrier having a lesser coefficient of thermal expansion than the piston material and not being locked to the cast piston material against relative radial movement of the piston body and the carrier.

BRIEF DESCRIPTION OF THE DRAWINGS

The following is a more detailed description of four embodiments of the invention, by way of example, reference being made to the accompanying drawings in which.

DESCRIPTION OF THE PREFERRED EMBODIMENTS

Figure 1:
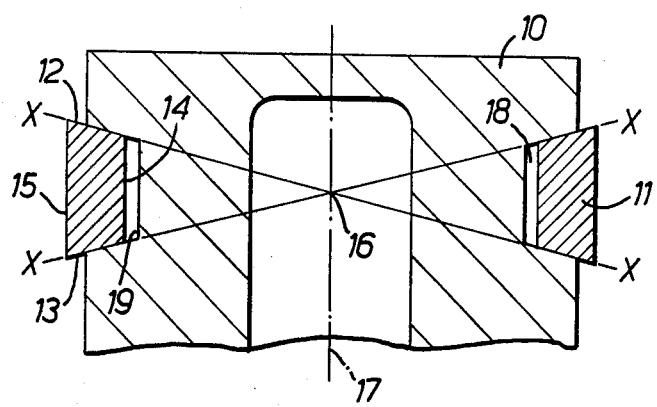
FIG. 1 is a schematic section through an upper part of a casting for a first form of piston showing a piston ring carrier encast therein.

Referring first to FIG. 1, the casting for the first form of piston comprises a piston body 10 and a piston ring carrier 11. The piston ring carrier 11 is formed from a ferrous material, such as grey cast iron, and is annular in shape with annular radially extending upper and lower surfaces 12, 13 and inner and outer surfaces 14, 15.

The upper and lower surfaces 12, 13 are frusto-conical with the same cone angle, and converge towards their radially inner ends. The axial length of the carrier 11 and the cone angle are such that the imaginary cones which define said frusto-conical surfaces (shown by the letters X in FIG. 1) have apices 16 which meet at a common point on the axis 17 of the annular carrier 11. The cone angle may, for example, be less than 5°, for example 1° or 2°.

Figure 2:
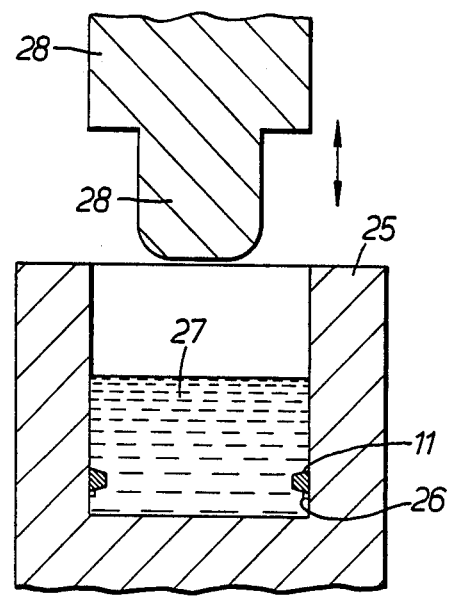
FIG. 2 is a schematic section through a casting die for producing the casting piston of FIG. 1 and showing an open die containing the piston ring carrier and molten metal.
Figure 3:
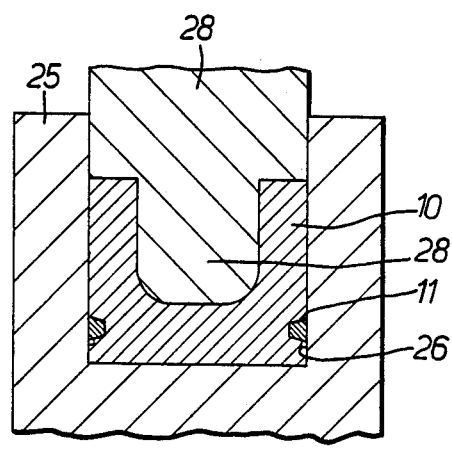
FIG. 3 is a similar view to FIG. 2 but showing the die closed and the piston casting solidified.

The piston body 10 is of aluminium or an aluminium alloy and is formed by, and the carrier 11 is incorporated by, a casting process. This may be a gravity casting process or may be a squeeze casting process in which molten metal fed to a mould under gravity is solidified under pressure. With reference to FIGS. 2 and 3, the carrier 11 is placed in an open lower mould member 25 of a die on die extensions 26 which position the carrier correctly in the mould 25. Molten metal 27 then fills the mould and the mould is closed by a male die member 28. The molten metal is then solidified—under pressure if the casting process is a squeeze casting process. The die member 28 is then withdrawn and the solidified casting 11 removed from the mould 25.

Since aluminium or aluminium alloys have a greater coefficient of thermal expansion than ferrous materials, the aluminium or aluminium alloy of the piston body 10 will, on solidification, contract more than the ferrous carrier. Due to the inclined frusto-conical surfaces 12, 13 on the carrier, the greater contraction of the piston body 10 produces a net radially outward force on the piston ring carrier 11 which causes the carrier 11 to expand elastically and so leave a gap 18 between the inner surface 14 of the carrier 11 and an inner surface 19 of the piston body, formed on initial solidification.

It will be appreciated that, in FIG. 1, the gap 18 is greatly exaggerated; in practise it will be small.

Figure 4:
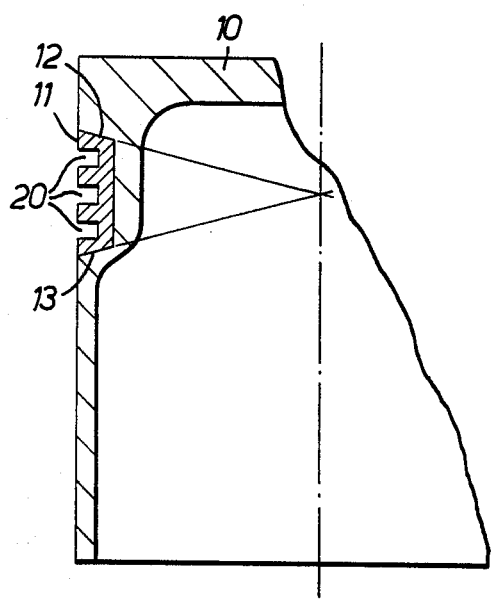
FIG. 4 is a partial section through a piston formed from a casting of the kind shown in FIGS. 1 to 3 and having a piston ring carrier including three piston ring grooves.

The piston body 10 and the piston ring carrier 11 are next finish machined with the piston ring carrier 11 being turned flush with the outer surface of the piston body 10. Then one or more piston ring grooves 20 (see FIG. 4) are formed in the piston ring carrier 11 and are fitted with respective piston rings (not shown).

In use, the piston will be subjected to various temperatures (high temperatures during operation and low temperatures when the engine is inoperative). Although this will cause differential expansion between the two parts, the carrier will not become loose-it would only begin to become loose at temperatures close to the melting point of the aluminium or aluminium alloy of the piston body. There will simply be slight relative sliding movement between the two parts which will produce no adverse effects. In particular, there is no wear or brinelling, nor is there any failure in the aluminium or aluminium alloy.

Figure 5:
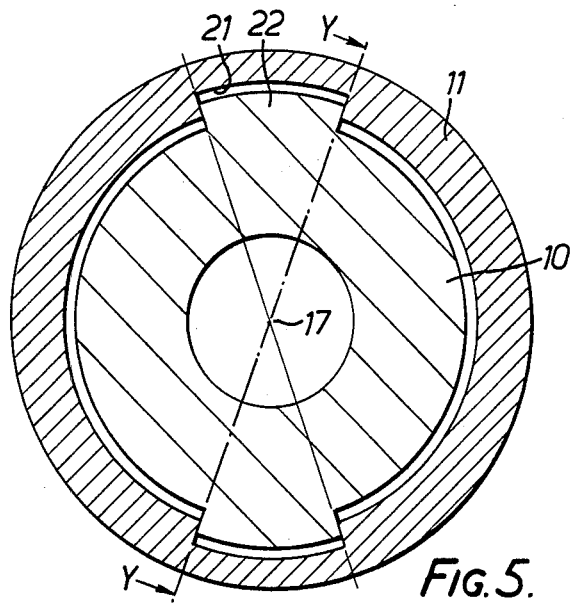
FIG. 5 shows a section through an upper end of a piston casting for a second form of piston and including a piston ring carrier encast therein, the section being in a plane normal to the piston axis.
Figure 6:
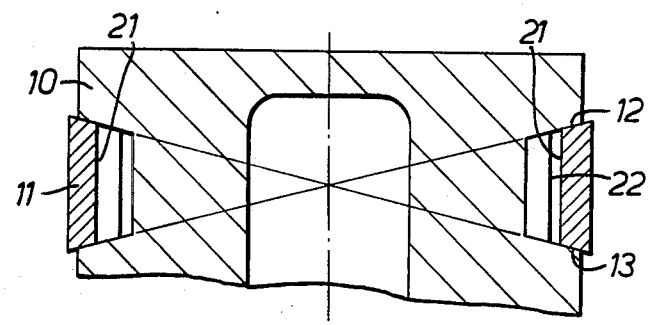
FIG. 6 is a section on the line Y—Y of FIG. 4.

Referring next to FIGS. 5 and 6, it may be desirable, in many cases, to prevent the carrier 11 rotating relatively to the piston body during machining, particularly during machining of the piston ring groove or grooves 20 in the carrier. For this purpose, as shown in FIG. 6, the carrier may be provided with arcuate diametrically opposed recesses 21 subtending an angle of between 10° and 20° at the axis 17 of the carrier. On casting, the piston material flows into these recesses and forms respective keys 22 which prevent relative rotation between the carrier 11 and the piston body 10. Of course, as seen in FIG. 6, the annular radially extending surfaces of the carrier are also convergant in this region and so there will be the same continuous contact throughout the operating temperature range.

It will be appreciated that the recesses 21 need not extend through the whole depth of the carrier 11; they need only extend part the distance through the depth of the carrier (i.e. the dimension in a direction parallel to the axis of the carrier).

Figure 7:
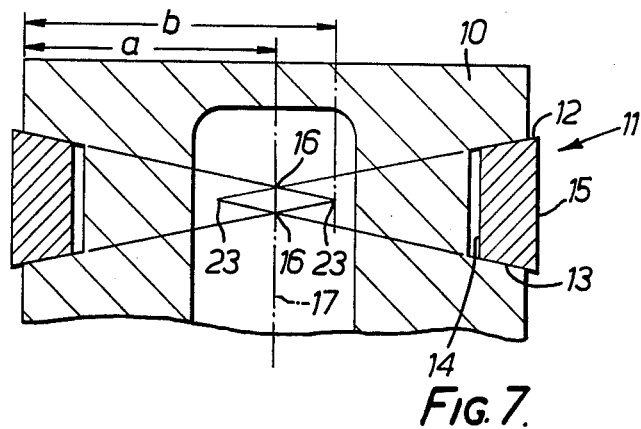
FIG. 7 is a schematic section of an upper part of a casting for a third form of piston, showing an alternative construction of piston ring carrier.

In certain circumstances, it is possible that the temperature of the carrier 11, when the piston is in operation in an engine, may be considerably less than the temperature of the aluminium or aluminium alloy piston body surrounding it. This raises the possibility of a clearance occurring between the body 10 and the carrier 11. This can be avoided by the construction shown in FIG. 7. In this embodiment, the imaginary cones which define the frusto-conical surfaces 12, 13 have apices 16 which are at points on the axis 17 of the carrier which are spaced apart, so that extensions of the surfaces of the imaginary cones intersect at a circle 23 between the carrier axis and the inner surface of the carrier.

If the piston diameter is a and the distance from the piston surface, through the piston axis, to the imaginary circle is b, then a ratio of $$b/a = 1.1$$

is sufficient to allow a difference of several tens of degrees C. between the carrier 11 and the piston body 10 without any possibility of a clearance occurring. This is because the reduction in the surface angle (which is what this measure amounts to) causes a reduction in the relative movement between the two parts as a result of temperature changes.

It will be appreciated that there are many possible variations which will be readily apparent to one skilled in the art. For example, both annular radially extending surfaces of the carrier need not be inclined, only one of them may be inclined to give the required convergence. In addition, the inclined surface or surfaces need not be frusto-conical, they could be arcuate in section or any other suitable section. In addition, the or each inclined surface need not be inclined by the same amount around the piston. It would be possible to vary the inclination and use such a variation to lock the carrier against rotation relative to the piston body.

The carrier need not be made of a ferrous material but could be made of any material which has a lower coefficient of thermal expansion than aluminium or aluminium alloy. The carrier can be formed with one piston ring or two or more piston rings.

The benefits of the pistons described above with reference to the drawings in relation to the commonly used AL-FIN bond, are as follows. The material costs and machining costs of the embodiments described above with reference to the drawings are lower since the AL-FIN type carrier is made of austenitic 16% nickel iron and is bonded to the piston body. In addition, no surface treatment of the carrier is required; it is simply loaded into the piston mould. This may allow automatic insertion into the piston mould of carriers of the kind described above with reference to the drawings.

Since carriers of the kind described above with reference to the drawings can be made of grey cast iron, the machining of such carriers will be easier than AL-FIN type carriers which, as mentioned above, are made of austenitic 16% nickel iron and are consequently harder and more difficult to machine. Further, because there is no bond between the carrier and the piston body, there is no requirement to test the bond by, for example, ultrasonic flaw detection equipment.

Although the thermal conductivity across the piston body carrier interface is less than that in an AL-FIN bonded carrier, the increased thermal conductivity of grey cast iron as compared with austenitic cast irons (about 15% higher) compensates for this and the overall thermal performance of a piston of the kind described above with reference to the drawings is substantially the same as that of a piston including an AL-FIN bond.

The piston ring band can be shorter than in a conventional piston and so the overall length of the piston can be reduced. This can lead to lower oil consumption and blowby and may allow the elimination of the heat expansion control rings commonly cast into aluminium or aluminium alloy pistons to reduce their expansion under operating conditions.

I claim:

1. A piston for an internal combustion engine comprising:
    a cast piston body of an aluminum alloy;
    an annular piston ring carrier of a material having a lesser coefficient of thermal expansion than the material of the piston body, and encast into the piston body to be held therein in an elastically expanded condition, the piston ring carrier not being locked against radial movement relative to the piston body;
    upper and lower annular radially extending surfaces provided on the piston ring carrier;
    inner and outer surfaces provided on the piston ring carrier between the upper and lower annular surfaces;
    a piston ring groove formed within the piston ring carrier and extending from said outer surface and terminating radially outwardly of said inner surface;
    said upper and lower radially extending surfaces being inclined relatively to a plane including the carrier axis, so that said surfaces converge to the radially inner ends thereof.

2. A piston according to claim 1, wherein the carrier is provided with at least one arcuate recess extending around a radially inner surface thereof, into which the piston body extends to prevent relative rotation between the carrier and the piston body.

* * * * *